US006865073B2

(12) United States Patent
Werner et al.

(10) Patent No.: US 6,865,073 B2

(45) Date of Patent: Mar. 8, 2005

(54) PANELBOARD METERING ARRANGEMENT AND METHOD OF ASSEMBLY THEREOF

(75) Inventors: Jeffrey E. Werner, Haw River, NC (US); Robert J. Caggiano, Wolcott, CT (US); Tamara Samuels, Hamden, CT (US); Michael R. Ronzello, Bristol, CT (US); Edward Barber, Durham, NC (US); Gopa Kumar, Secunderabad (IN); Thomas Francis Vrnak, Chapel Hill, NC (US); Michael B. Davenport, Montrose, PA (US)

(73) Assignee: General Electric Company, Schenectady, NY (US)

( * ) Notice: Subject to any disclaimer, the term of this patent is extended or adjusted under 35 U.S.C. 154(b) by 85 days.

(21) Appl. No.: 10/248,984

(22) Filed: Mar. 6, 2003

(65) Prior Publication Data

US 2004/0174664 A1 Sep. 9, 2004

(51) Int. Cl.[7] .................................................. H02B 1/42

(52) U.S. Cl. ...................... 361/624; 361/625; 361/93.1; 324/126; 324/127

(58) Field of Search ................................ 361/622, 625, 361/614, 644, 657, 660, 601, 605, 664–666, 668, 671; 324/115, 124, 127, 107, 96, 111, 142, 126; 364/492; 340/870.11, 870.02; 702/64, 65, 60

(56) References Cited

U.S. PATENT DOCUMENTS 3,183,408 A * 5/1965 Keller et al. ................ 361/663
3,617,814 A 11/1971 Stanback .................... 317/106
3,955,123 A 5/1976 Goodridge .................. 317/106
4,203,146 A 5/1980 Sabatella et al. ........... 361/361
4,327,396 A 4/1982 Schacht ...................... 361/379
4,675,598 A * 6/1987 Boichot-Castagne ........ 324/126
5,150,039 A * 9/1992 Avocat ....................... 324/127
5,831,550 A * 11/1998 Sigiliao Da Costa et al. .... 340/870.05
6,470,283 B1 * 10/2002 Edel ............................ 702/64
6,728,646 B2 * 4/2004 Howell et al. ................ 702/62
6,754,059 B2 * 6/2004 Bach et al. ................ 361/93.1

FOREIGN PATENT DOCUMENTS

| | | | | | |
|---|---|---|---|---|---|
| DE | 29621625 | U1 * | 2/1997 | ............ | H01B/5/08 |
| DE | 19821953 | A1 * | 11/1999 | ........... | G01R/15/18 |
| EP | 000492018 | A1 * | 7/1992 | ........... | H01F/38/28 |
| EP | 561727 | A1 * | 9/1993 | ............ | H02B/1/03 |
| JP | 02000295723 | A1 * | 10/2000 | ............ | H02B/1/42 |
| JP | 02002071734 | A * | 3/2002 | ........... | G01R/22/00 |
| WO | WO 99/46606 | * | 9/1999 | ........... | G01R/15/18 |

* cited by examiner

*Primary Examiner*—Michael Datskovsky
(74) *Attorney, Agent, or Firm*—Cantor Colburn LLP

(57) ABSTRACT

A panelboard having an enclosure includes at least one busbar having a plurality of electrical distribution connection points, and a current transformer module having a current transformer integral with and in signal communication with each of the busbars. A signal path is associated with and in signal communication with each current transformer for communicating a signal therefrom. In application, a load current passing through each of the busbars within the panelboard results in a signal, representative of the associated load current, at the associated current transformer and signal path.

19 Claims, 5 Drawing Sheets

165 200 115 145 105 110 150 260 280 300 130 155 165 140 145 150 105 125 130 120 135 110 160 100

100

100
140
155
155
170
170
175
180
180
185
300
400
412
414
416
445

400
180
410
430
445
610
600
170
To wires 250
170
180

400
430
420
440
605
600
450
410

PANELBOARD METERING ARRANGEMENT AND METHOD OF ASSEMBLY THEREOF

BACKGROUND OF THE INVENTION

The present disclosure relates generally to electrical distribution panelboards, and particularly to electrical distribution panelboards with power metering.

The distribution of electrical power is typically managed using distribution enclosures, such as load centers, panelboards, switchboards, and the like, and may include the use of power meters to monitor the usage of the electrical power. Load centers and panelboards are constructed as wall mounted enclosures, while switchboards are constructed as standalone enclosures. When employed, power meters are typically arranged separate from the distribution enclosure, or in the case of switchboards, may be incorporated into the switchboard in a retrofit manner for industrial applications. To advance the technology of electrical power distribution and monitoring, it would beneficial to provide a compact panelboard having metering capability.

SUMMARY OF THE INVENTION

In one embodiment, a panelboard having an enclosure includes at least one busbar having a plurality of electrical distribution connection points, and a current transformer module having a current transformer integral with and in signal communication with each of the busbars. A signal path is associated with and in signal communication with each current transformer for communicating a signal therefrom. In application, a load current passing through each of the busbars within the panelboard results in a signal, representative of the associated load current, at the associated current transformer and signal path.

In another embodiment, an apparatus includes a busbar arrangement, a current sensor arrangement, and a metering arrangement. The current sensor arrangement is integral with and in signal communication with the busbar arrangement, and each busbar of the busbar arrangement includes a plurality of electrical distribution connection points. The metering arrangement is in signal communication with the current sensor arrangement and includes at least one of a meter and a meter socket. In application, a load current passing through each busbar of the busbar arrangement results in a signal, representative of the associated load current, at an associated current sensor of the current sensor arrangement and at the metering arrangement.

In a further embodiment, a method of assembling a current transformer module integral with a busbar arrangement of a panelboard is disclosed. A plurality of current transformers are arranged in fixed relation with each other to form a current transformer module having current transformer openings at a predefined spatial relationship, the openings being receptive of busbars. The current transformer module is coupled to the busbar arrangement by positioning a busbar of the busbar arrangement within each of the openings of the current transformer module. The position of the current transformer module is then fixed relative to the busbar arrangement.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the present invention provides an electrical distribution panelboard having a current transformer module integrally arranged with the busbars within the panelboard, thereby enabling a compact modular meter enclosure to be coupled thereto. While the embodiment described herein depicts a current transformer as an exemplary current sensing device for providing current metering, it will be appreciated that the disclosed invention is also applicable to other current sensing arrangements, such as hall effect devices for example.

Figure 1:
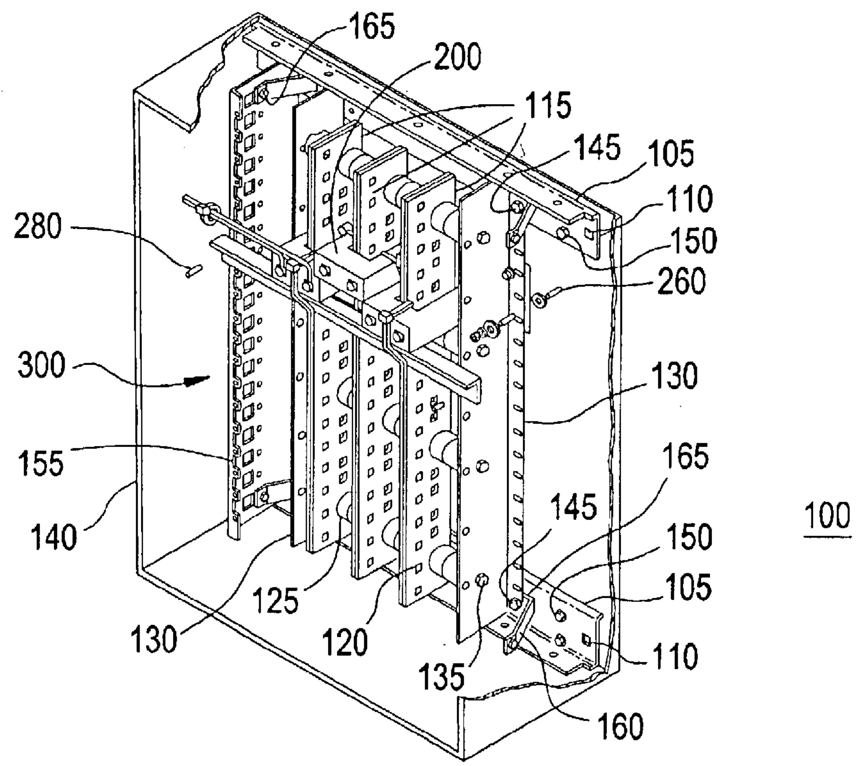
FIG. 1 is an isometric view of a panelboard with the cover removed in accordance with an embodiment of the invention.

FIG. 1 is an exemplary embodiment of a panelboard 100 for use in an electrical distribution system, which is constructed having end supports 105 with holes 110 for mounting on studs accessible at an enclosure 140 that is mounted onto a vertical structure such as a wall for example. Within panelboard 100 is a plurality of busbars 115 for carrying and distributing the primary current of an electrical system. FIG. 1 depicts a panelboard 100 having three busbars 115, one for each phase of a three-phase electrical distribution circuit, however, the artisan will appreciate that the invention disclosed herein is equally suitable to busbar arrangements having other than three busbars, such as a switching neutral panelboard having four busbars, or a single-phase dual-voltage panelboard having two busbars, for example. Additionally, each phase within panelboard 100 may have one or more than one conductor that constitutes a busbar 115 within that phase. Furthermore, although busbars 115 are depicted in an edge-wise mounting arrangement, it will be appreciate that busbars 115 may also be configured in a flat-wise mounting arrangement. A plurality of holes 120 within and along the length of each busbar 115 provide electrical distribution connection points for attaching branch circuits or other distribution devices, not shown. Busbars 115 are held in fixed relation with each other via insulated spacers 125, side supports 130, and suitable hardware 135. As used herein, suitable hardware means any combination of nuts, bolts, washers, screws, self tapping screws, welds, or any other suitable means for fastening the respective parts together for the purpose disclosed herein. Side supports 130 are secured to enclosure 140 via end supports 105 and suitable hardware 145, 150. A pair of side rails 155 (one on each side of enclosure 140 but only one shown for clarity) are attached to end supports 105 by braces 160 and suitable hardware 165, thereby providing a means for integrating other devices, to be discussed below, with panelboard 100. Integral with busbars 115 of panelboard 100 is a current transformer module 200, best seen by now referring to FIG. 2.

Current transformer module 200 includes current transformers 202, 204, 206, one current transformer for each busbar 115, a mounting plate 210, and a mounting support 215. Each current transformer 202, 204, 206 has a pair of flanges 220, one on each side, at one end for mounting current transformer 202, 204, 206 to mounting plate 210 using suitable hardware 225. Opposite to the flange end, each current transformer 202, 206 has an outer surface 240 resting on a support surface 245 of mounting support 215. Tie wraps 230, passing through openings 232, 236, securely fasten each current transformer 202, 206 to mounting support 215, and tie wraps 230, passing through openings 232, 234 and through 234, 236, securely fasten current transformers 202, 204, 206 to each other. Wires 250 connected to terminals 255 of current transformer 202 provide a signal path for communicating a signal originating from current transformer 202. Although not shown, current transformers 204, 206 have a similar wiring arrangement. In an embodiment, current transformer module 200 is arranged with current transformer 204 offset from current transformers 202, 206, which is achieved by appropriate mounting of flanges 220 to mounting plate 210, and by seating the underside edges 265 of current transformer 204 on the topside edges 270 of adjacent current transformers 202, 206. In this manner, the overall width dimension "D" of the three-current-transformer-arrangement is less than the sum of the separate width dimensions "d" of each current transformer 202, 204, 206 in the arrangement, thereby providing for a more compact current transformer module 200.

Figure 2:
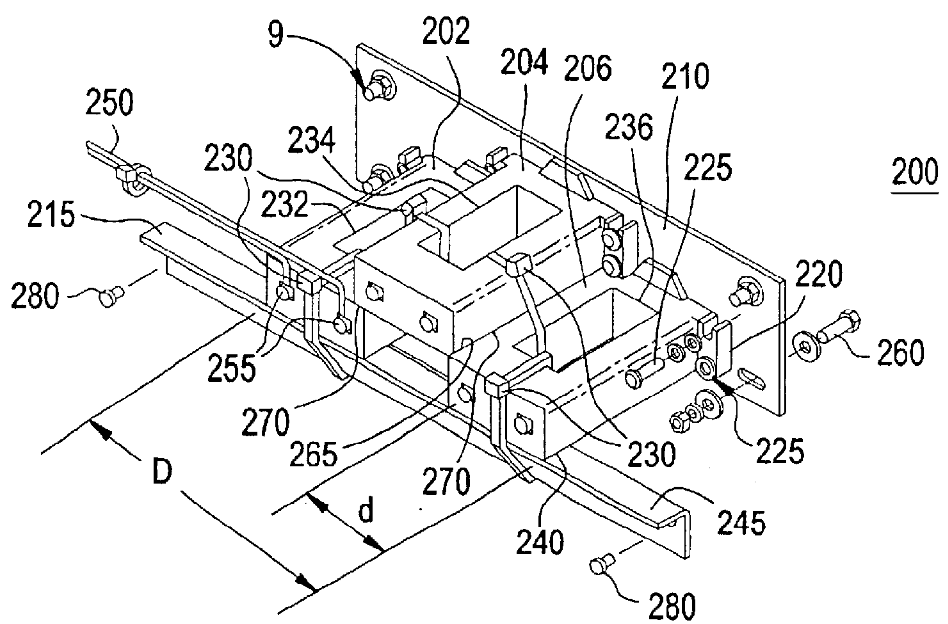
FIG. 2 is an isometric view of an exemplary current sensor arrangement for use in the panelboard of FIG. 1.

Referring now back to FIG. 1, current transformer module 200 is securely fastened in fixed relation to busbars 115 via mounting plate 210, side supports 130, and suitable hardware 260, and via mounting support 215, side rails 155 and suitable hardware 280. In the assembled state, busbars 115 for a first phase are arranged within opening 232 of current transformer 202, for a second phase within opening 234 of current transformer 204, and for a third phase within opening 236 of current transformer 206. Signals from current transformers 202, 204, 206 are representative of the current level in the associated busbars 115, and the controlled fixed relationship between current transformers 202, 204, 206 and busbars 115 provides for current transformer signals having revenue metering accuracy, with the accuracy being on the order of about 0.30%. The assembly of components internal to enclosure 140, as depicted in FIGS. 1 and 2, are referred to as the interior 300 of panelboard 100.

Figure 4:
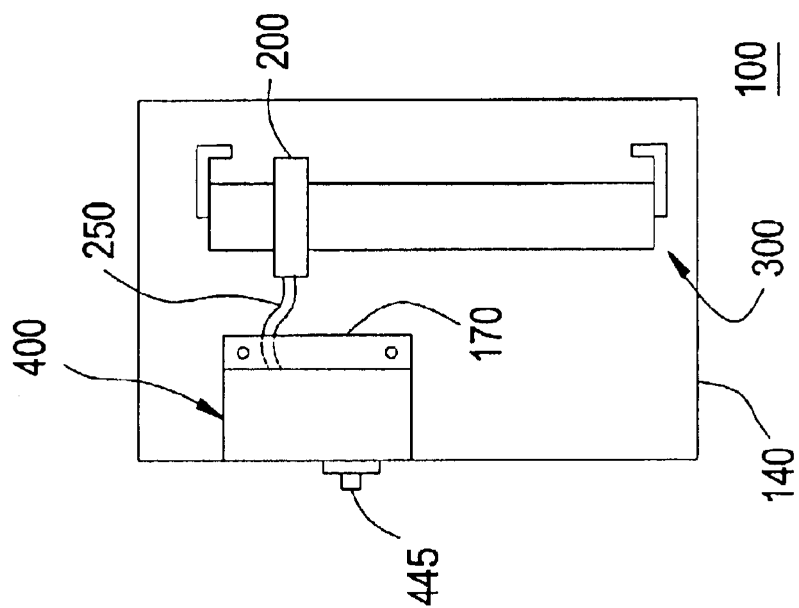
FIG. 4 is a side view of the exemplary panelboard of FIG. 3, with the side panel removed.
Figure 3:
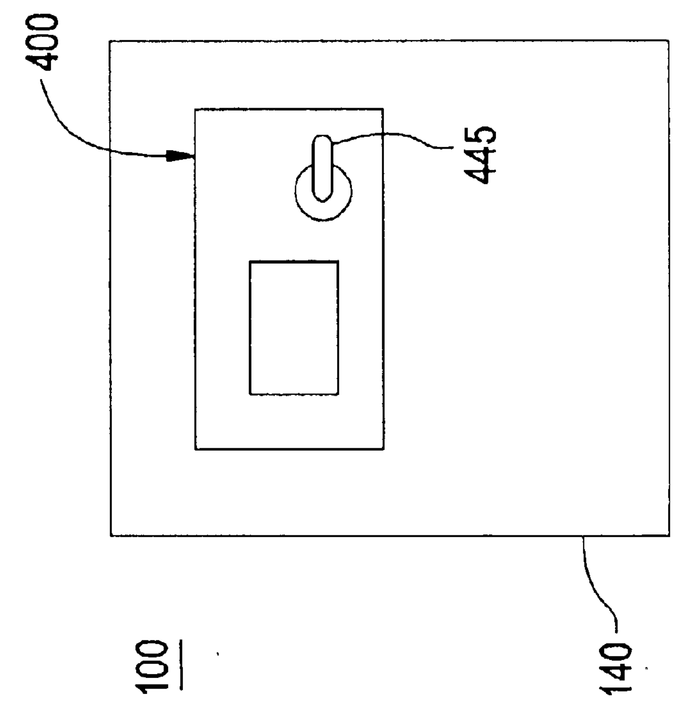
FIG. 3 is a front view of the exemplary panelboard of FIG. 1, with the cover installed.
Figure 5:
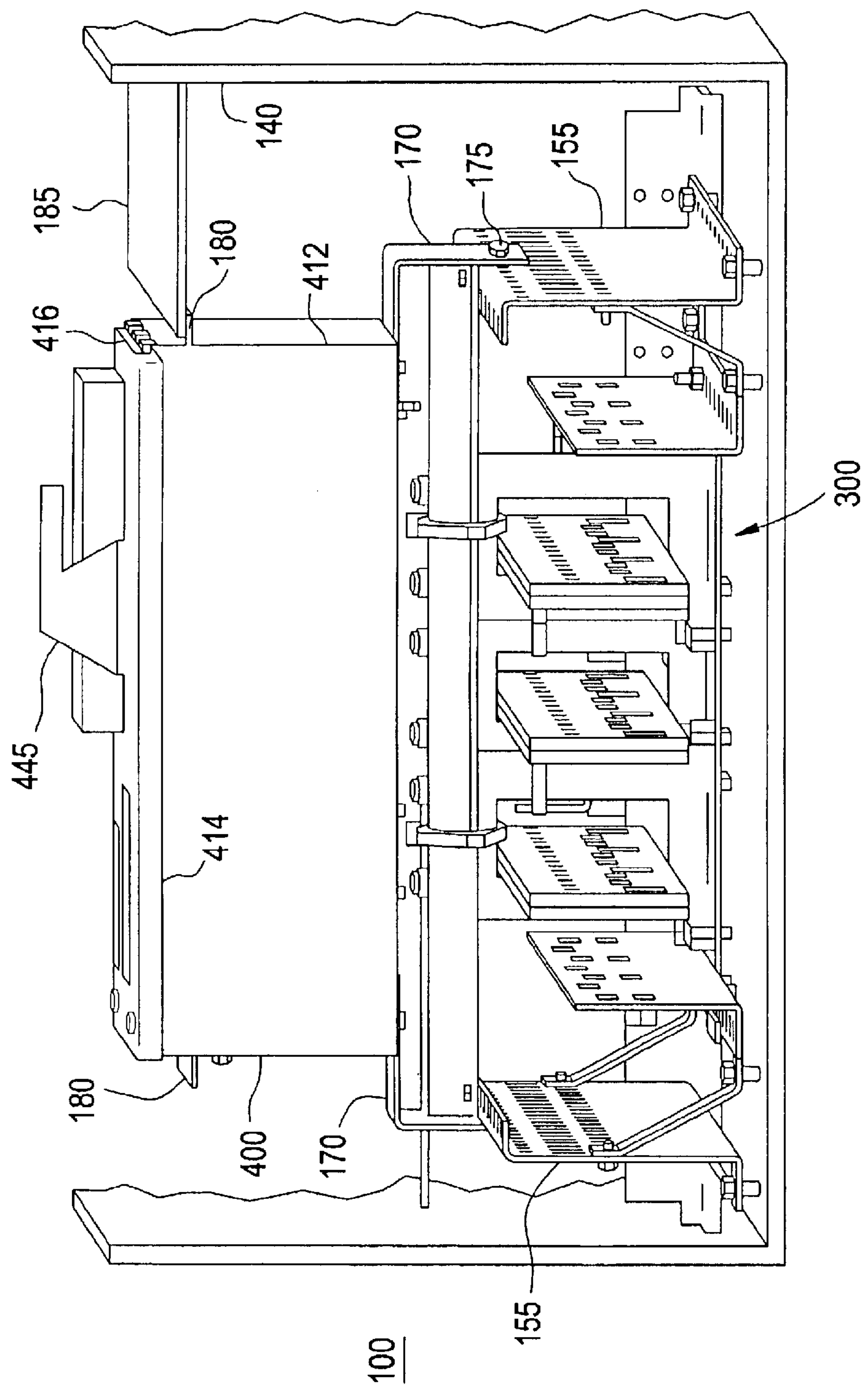
FIG. 5 is an isometric view of the exemplary panelboard of FIGS. 3 and 4, with an end wall removed for clarity.
Figure 6B:
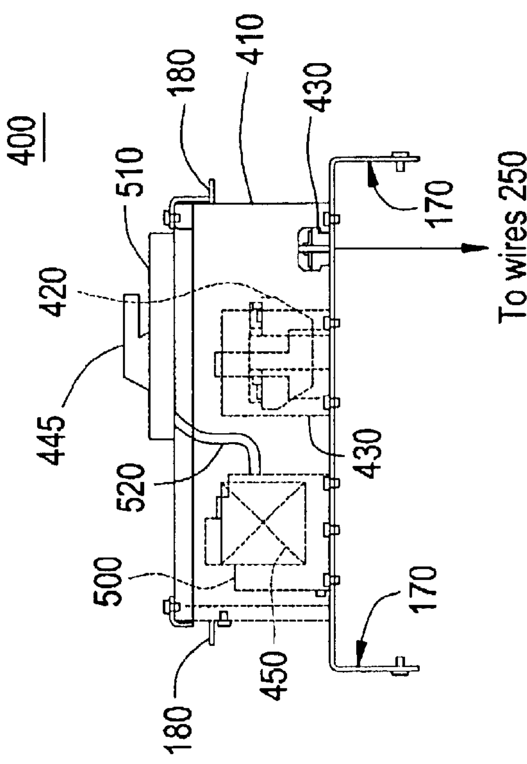
FIG. 6B is a side view of the exemplary meter module of FIG. 6A.
Figure 6A:
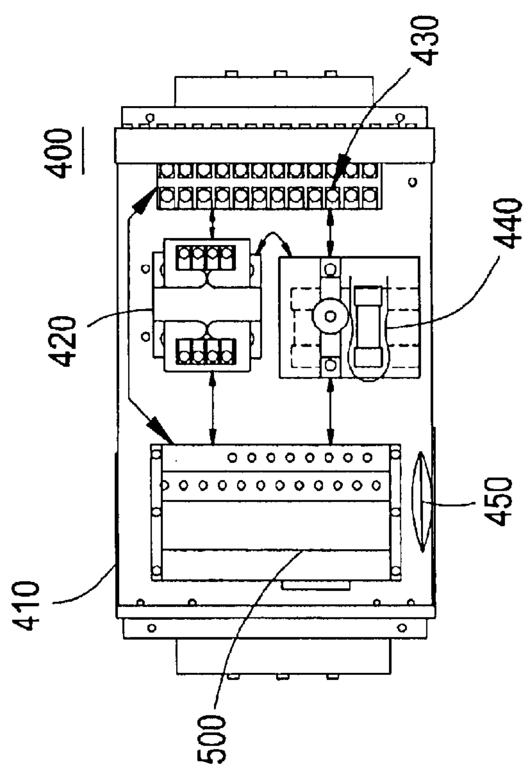
FIG. 6A is a front view of an exemplary meter module for use in an embodiment of the invention.
Figure 7B:
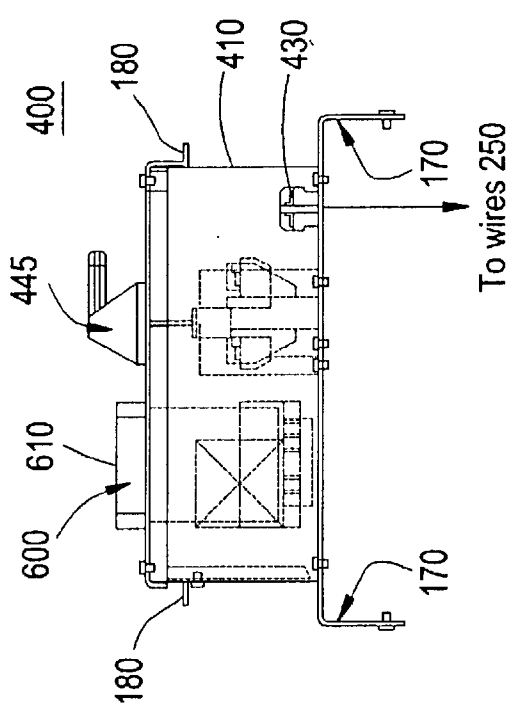
FIG. 7B is a side view of the alternative meter module of FIG. 7A.
Figure 7A:
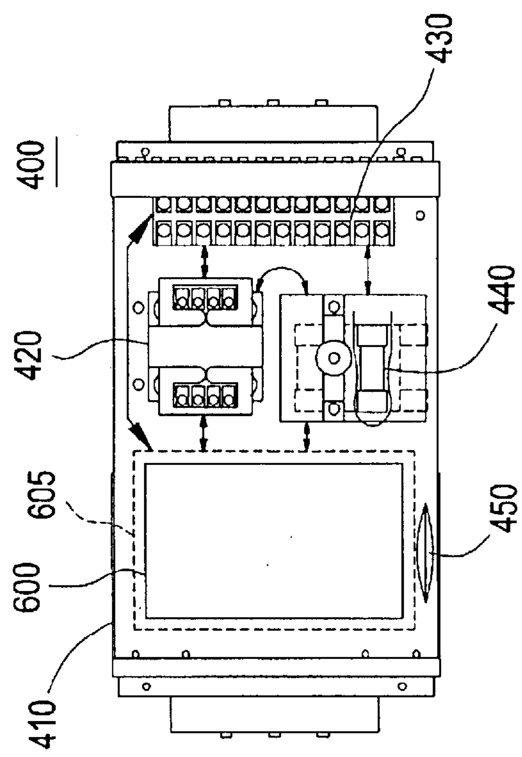
FIG. 7A is a front view of an alternative meter module to that of FIG. 6A.

By referring now to FIGS. 3–5, panelboard 100 is depicted having a meter module 400 in signal communication with interior 300 via wires 250, and arranged within enclosure 140. Brackets 170 provide mounting means to secure meter module 400 to side rails 155 via suitable hardware 175, and flanges 180 provide support means to secure filler or trim plates 185 between meter module 400 and enclosure 140. In alternative embodiments, meter module 400 is adapted to receive either a fixed meter 500, depicted in FIGS. 6A–6B, or a removable meter 600, depicted in FIGS. 7A–7B. Fixed meter 500 includes a display 510 connected to meter 500 via a wiring harness 520. Removable meter 600 includes an integral display 610. The mechanical and communication interface between removable meter 600 and meter module 400 is depicted by dashed lines 605 in FIG. 7A. Referring now to FIGS. 6A–6B and 7A–7B collectively, meter module 400 is depicted having an enclosure 410, a current potential transformer 420 for providing a phase potential signal from busbars 115 to meter 500, 600, a terminal block 430 for providing an organized wiring arrangement, an electrical disconnect 440 for isolating components of meter module 400 from system voltage at busbars 115, and a wiring diagram 450 for providing wiring connection information to the end user, in addition to either fixed meter 500 or removable meter 600. Enclosure 410 includes a base 412 and a cover 414, pivotally coupled via a piano hinge 416. Electrical disconnect 440 is operable via disconnect handle 445. In an embodiment: terminal block 430 is in signal communication with current potential transformer 420, electrical disconnect 440, meter 500, 600, and current transformer wires 250; current potential transformer 420 is in signal communication with meter 500, 600, terminal block 430, and electrical disconnect 440; electrical disconnect 440 is in signal communication with meter 500, 600, current potential transformer 420, and terminal block 430; and, meter 500, 600 is in signal communication with current potential transformer 420, terminal block 430, and electrical disconnect 440. In an alternative embodiment, current potential transformer 420 is integral with meter 500, 600, and current transformer 202, 204, 206 is replaced with an alternative current sensor arrangement, such as a Hall effect device for example.

The integral assembly of current transformer module 200 with busbars 115 is achieved by arranging current transformers 202, 204, 206 in fixed relation with each other, as discussed above, to form current transformer module 200, with openings 232, 234, 236 arranged at a predefined spatial relationship, typically referred to as the center-to-center phase spacing of the busbars 115. With openings 232, 234, 236 being receptive of busbars 115, current transformer module 200 is coupled to busbars 115 by positioning each phase busbar 115 within the respective phase opening 232, 234, 236 of current transformers 202, 204, 206. Current transformer module 200 is then fixed relative to busbars 115, as discussed above, thereby providing a revenue metering accuracy assembly.

During operation of panelboard 100, load current passing through each busbar 115 develops an associated magnetic field that is sensed at current transformers 202, 204, 206, which produce a signal, received at meter 500, 600, representative of the associated load. The closely coupled fixed relationship of current transformers 202, 204, 206 to busbars 115 provides for a high degree of accuracy in the signal representative of the load current, thereby enabling revenue metering accuracy, on the order of about 0.30%, in a wall-mounted panelboard arrangement.

Embodiments of the invention provide a compact modular metering arrangement that is integral to the panelboard 100 itself, and offers revenue metering accuracy. The modular arrangement allows for the use of different meter modules 400 that can accept fixed meters 500 or removable meters 600 with ampere ratings from about 250 amps to about 1200 amps and voltage ratings from about 120 volts to about 600 volts. The modular arrangement of meter module 400 also provides for a meter arrangement that is independent of the enclosure width and independent of whether the distribution circuit protective devices (not shown but typically utilized in panelboards) are plug-in or bolt-on devices, or whether the main disconnect device (not shown but also typically utilized in panelboards) is a main lug device or a main breaker device. The width of the panelboard can vary from about 27-inches to about 44-inches.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments failing within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A panelboard having an enclosure, comprising:

a plurality of busbar each of which having a plurality of electrical distribution connection points;

a current transformer module having a current transformer integral with and in signal communication with each of the plurality of busbar; and a signal path associated with and in signal communication with each current transformer for communicating a signal therefrom;

wherein the current transformer module has at least one current transformer in an offset relationship with at least one other current transformer resulting in an arrangement of current transformers having an overall width dimension that is less than the sum of the separate width dimensions of each current transformer in the arrangement.

2. The panelboard of claim 1, wherein:

each current transformer is fixed relative to an associated busbar of the plurality of busbar.

3. A panelboard having an enclosure, comprising:

a plurality of busbar each of which having a plurality of electrical distribution connection points;

a current transformer module having a current transformer integral with and in signal communication with each of the plurality of busbar; and a signal path associated with and in signal communication with each current transformer for communicating a signal therefrom;

the current transformer module further comprising:

first and second mounting surfaces on each current transformer;

a mounting plate fixedly coupled to the first mounting surface of each current transformer; and a mounting support fixedly coupled to the second mounting surface of at least one current transformer; whereby each current transformer is fixed relative to each other current transformer.

4. The panelboard of claim 3, further comprising:

at least one side support fixedly arranged within the panelboard and adapted to secure the current transformer module thereto.

5. The panelboard of claim 1, further comprising:

a meter module arranged within the panelboard and adapted to receive a meter, the meter module being in signal communication with the current transformer module.

6. The panelboard of claim 4, wherein:

the meter is at least one of a fixed meter and a removable meter.

7. The panelboard of claim 1, wherein:

a load current passing through each of the plurality of busbar within the panelboard results in a signal at the associated current transformer and a signal at the associated signal path representative of the associated load current; and the resultant signal at the associated signal path of each current transformer is representative of the load current in the associated busbar to an accuracy of equal to or greater than about 0.3%.

8. The panelboard of claim 1, further comprising a mounting surface adapted to mount the panelboard to a vertical structure only.

9. The panelboard of claim 5, wherein the meter module further comprises:

at least one of a current potential transformer, an electrical disconnect, a terminal block, and a wiring diagram; wherein at least one of the meter module, the current potential transformer, the electrical disconnect, and the terminal block is in signal communication with at least one of the meter module, the current potential transformer, the electrical disconnect, the terminal block, and the current transformer module.

10. The panelboard of claim 5, wherein the meter module further comprises a meter and a current potential transformer integral with the meter.

11. An apparatus, comprising:

a busbar arrangement, each busbar having a plurality of electrical distribution connection points;

a current sensor arrangement integral with and in signal communication with the busbar arrangement; and a metering arrangement in signal communication with the current sensor arrangement, the metering arrangement having at least one of a meter and a meter socket;

wherein the current sensor arrangement has at least one current sensor in an offset relationship with at least one other current sensor resulting in an arrangement of current sensors having an overall width dimension that is less than the sum of the separate width dimensions of each current sensor in the arrangement.

12. The apparatus of claim 11, wherein the current sensor arrangement is fixed relative to the busbar arrangement.

13. The apparatus of 11, claim further comprising a mounting surface adapted to mount the apparatus to a vertical structure only.

14. The apparatus of claim 11, wherein the current sensor arrangement is adapted to provide a signal associated with and representative of each load current to a revenue metering accuracy.

15. The apparatus of claim 14, wherein the revenue metering accuracy is an accuracy of equal to or greater than about 0.3%.

16. The apparatus of claim 11, wherein the metering arrangement comprises at least one of a fixed meter and a removable meter.

17. The apparatus of claim 11, wherein the metering arrangement further comprises:

at least one of a current potential transformer, an electrical disconnect, a terminal block, and a wiring diagram; wherein at least one of the metering arrangement, the current potential transformer, the electrical disconnect, and the terminal block is in signal communication with at least one of the metering arrangement, the current potential transformer, the electrical disconnect, the terminal block, and the current sensor arrangement.

18. The apparatus of claim 11, wherein the metering arrangement further comprises a meter and a current potential transformer integral with the meter.

19. A method of assembling a current transformer module integral with a busbar arrangement of a panelboard, comprising:

arranging a plurality of current transformers form a current transformer module having current transformer openings receptive of busbars;

arranging at least one current transformer of the current transformer module in an offset relationship with at least one other current transformer to provide an arrangement of current transformers having an overall width dimension that is less than the sum of the separate width dimensions of each current transformer in the arrangement;

coupling the current transformer module to the busbar arrangement by positioning a busbar of the busbar arrangement within each of the openings of the current transformer module; and fixing the position of the current transformer module relative to the busbar arrangement.

* * * * *